United States Patent [19]
Miller

[11] Patent Number: 5,943,458
[45] Date of Patent: Aug. 24, 1999

[54] MACH-ZEHNDER INTERFEROMETRIC DEVICES WITH COMPOSITE FIBERS

[75] Inventor: William J. Miller, Corning, N.Y.

[73] Assignee: Corning Incorporated, Corning, N.Y.

[21] Appl. No.: 08/870,522

[22] Filed: Jun. 6, 1997

Related U.S. Application Data

[63] Continuation-in-part of application No. 08/672,188, Jun. 27, 1996, Pat. No. 5,703,975, which is a continuation-in-part of application No. 08/489,090, Jun. 9, 1995, abandoned
[60] Provisional application No. 60/016,057, Jul. 8, 1996.
[51] Int. Cl.[6] ........................................ G02B 6/26
[52] U.S. Cl. ............................. 385/39; 356/345
[58] Field of Search ..................... 385/1, 39, 40, 385/41, 43, 46, 50, 42, 24, 27, 31; 359/135, 139, 180, 161, 173; 356/345; 65/408, 409

[56] References Cited

U.S. PATENT DOCUMENTS

| | | | |
|---|---|---|---|
| 5,295,205 | 3/1994 | Miller et al. | 385/1 |
| 5,351,325 | 9/1994 | Miller et al. | 385/42 |
| 5,499,308 | 3/1996 | Arai et al. | 385/27 |
| 5,703,975 | 12/1997 | Miller et al. | 385/16 |

OTHER PUBLICATIONS

"Fiber Optic Tunable Microwave Transversal Filter", Michael Y. Frankel and Ronald D. Esman, IEEE Photonics Technology Letters, vol. 7, No. 2, pp. 191–193, Feb. 7, 1995.
Patent Abstracts of Japan, vol. 017, No. 669 (P–1657), Dec. 9, 1993 & JP–05 224252 A (Nippon Telegr & Teleph Corp), Sep. 3, 1993, Abstract.

Primary Examiner—Akm E. Ullah
Attorney, Agent, or Firm—Edward F. Murphy; W. J. Simmons, Jr.

[57] ABSTRACT

A Mach-Zehnder wavelength selective device is made using one or more composite optical fibers each incorporating a phase shift region having one effective refractive index spliced between coupling regions having a different effective refractive index. The optical path length difference or phase delay induced by each such composite fiber is a linear function of the length of the phase shift region.

31 Claims, 3 Drawing Sheets

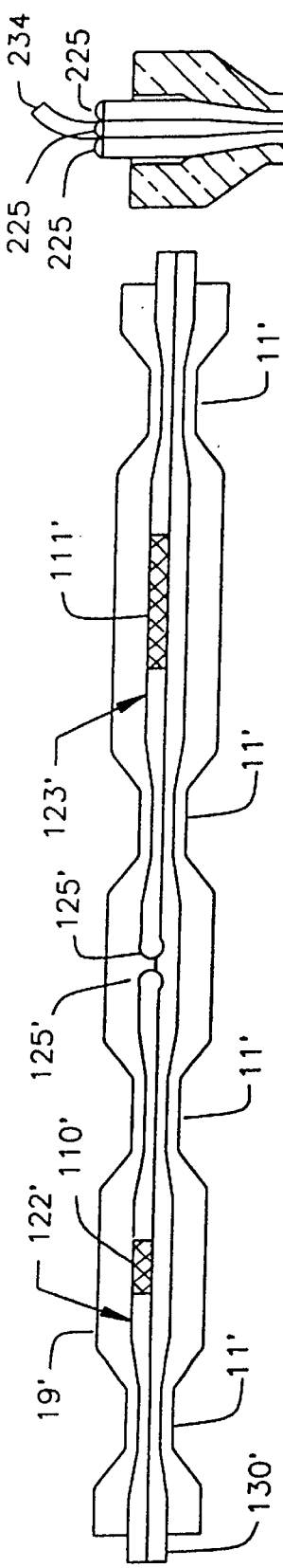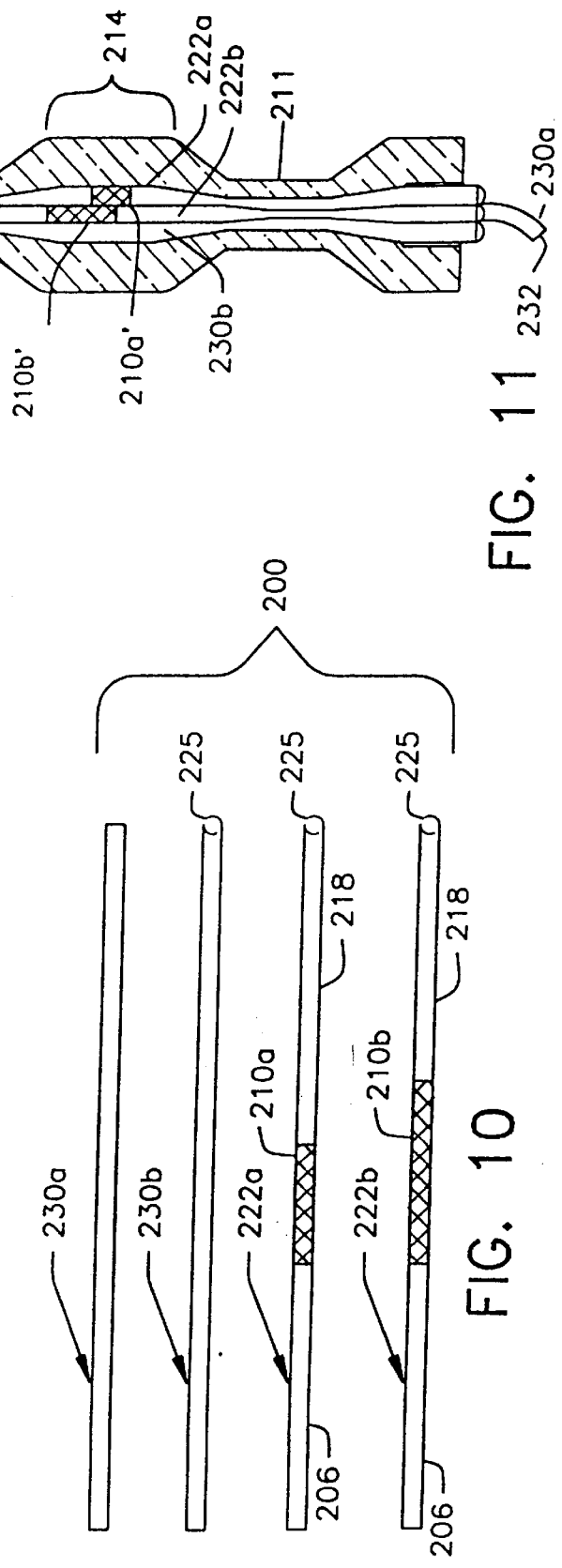

MACH-ZEHNDER INTERFEROMETRIC DEVICES WITH COMPOSITE FIBERS

This application claims priority to U.S. Provisional Patent Application 60/016,057 filed on Jul. 8, 1996. This application is a continuation in part of U.S. patent application Ser. No. 08/672,188 filed on Jun. 27, 1996 (now U.S. Pat. No. 5,703,975 issued on Dec. 30, 1997) which was a continuation in part of U.S. patent application Ser. No. 08/489,090 filed on Jun. 9, 1995 (now abandoned); this application claims priority to U.S. Ser. Nos. 08/672,188 and 08/489,090.

BACKGROUND OF THE INVENTION

The present invention relates to Mach-Zehnder interformetric devices and to methods of making the same.

Optical fiber communication systems require wavelength selection devices for various purposes. For example, in a wavelength division multiplexing transmission scheme, a single fiber may carry several beams of light at slightly different wavelengths. Each beam carries a separate stream of information. A wavelength selective filter is used at a point where the fiber branches to direct one beam at a particular wavelength onto one branch of the fiber and to direct the other beams onto the other branch. Several receivers belonging to different telecommunications customers can be connected to a single fiber. Each receiver is equipped with a filter adopted to direct only a very narrow band of wavelengths to that device and to exclude all others. Signals intended for the particular subscriber are sent at the wavelength associated with that subscriber.

These and other wavelength selective devices must meet demanding requirements for use in practical communications systems. The devices should be capable of separating wavelengths differing from one another by only a few nanometers. The wavelength selective device should be environmentally stable, reliable and durable. In some applications, the wavelength selective device should be "tunable" or adjustable to vary the wavelengths which it selects. Also, the wavelength selective device should operate with a relatively low loss of optical power, i.e., the device should not dissipate substantial amounts of the optical power supplied to it.

Mach-Zehnder interferometers have been utilized as wavelength selective devices in optical communication systems. As depicted in FIG. 1, a Mach-Zehnder interferometer includes a pair of fibers F1 and F2. The fibers are coupled to one another for light transfer therebetween at a first coupler $C_1$ and a second couple $C_2$. The couplers are arranged to transfer light, one fiber to the other. As further explained below, the couplers may be so-called "evanescent" couplers in which narrowed, elongated portions of the fibers are closely juxtaposed with one another within a matrix or outer coating. The couplers may be 3dB couplers, arranged to transfer approximately one-half of the optical power supplied on one fiber to the other fiber. Fibers F1 and F2 have phase shift regions with different optical path lengths disposed between the couplers. Thus, the optical path length over the phase shift region in fiber F1 is different from the optical path length over the phase shift region in fiber F2. As used in this disclosure, the term "optical path length" is a measure of the time required for light at a given wavelength and in a given propagation mode to pass through the fiber from one end to the other. The optical path length difference has been provided either by making the phase shift region of one fiber physically longer than the other, or by making the two fibers F1 and F2 with different propagation constants so that the velocity of light within the two fibers is different. The latter structure can be effected by making the fibers with different refractive index profiles. Where the fibers are "step-index" fibers, incorporating a core having a relatively high refractive index and a coating with a relatively low refractive index overlying the core, the two fibers may have cores of different refractive indices, different core diameters, different coating refractive indices or some combination of these. Regardless of the particular mechanism used to produce the optical path length difference, the single stage Mach-Zehnder filter depicted in FIG. 1 will direct light supplied through input 1 either to output 3 or to output 4 depending upon the wavelength of the light. More complex Mach-Zehnder devices utilize multiple stages with multiple phase shift regions and multiple couplers connected in series to achieve certain desirable wavelength-selective characteristics. Still other Mach-Zehnder devices incorporate more than two fibers connected in parallel between the couplers, as described in U.S. Pat. No. 5,351,325, the disclosure of which is hereby incorporated by reference herein. The various optical fibers incorporate different optical path lengths. Desirably, the optical path length differences are selected to provide optical path length differences which are rational or integral multiples of one another.

For Mach-Zehnder devices to provide the desired wavelength-selective characteristics, the path length differences should be as specified in the design device and should remain stable except when deliberately altered. Environmental effects, such as movement or vibration of the individual fibers, and differential heating or cooling of the fibers can severely degrade the performance of Mach-Zehnder components. U.S. Pat. No. 5,295,205 ('the '205 patent"), the disclosure of which is also hereby incorporated by reference herein, discloses an improved Mach-Zehnder device incorporating an elongated body of a matrix glass formed as a hollow tube. The optical fibers extend through the bore of the tube. Each coupler may be formed by collapsing a portion of the tube onto the fibers, as by heating it, and then stretching a portion of the collapsed tube, and portions of the fibers contained therein, to provide narrowed, elongated sections in the fibers surrounded by the matrix glass. This general approach can be utilized to form a wide variety of Mach-Zehnder components, including those having more than two fibers and staged devices having more than two couplers. The devices formed in accordance with preferred embodiments of the '205 patent are securely encased within the matrix glass tube and hence are substantially insensitive to temperature gradients and undesired, inadvertent bending. The preferred devices formed according to the '205 patent, therefore, can be used as components in practical telecommunication systems.

Despite these and other advances in the art, there is a need for further improvement. Manufacture of Mach-Zehnder devices using fibers with different propagation constants requires the manufacturer to stock fibers having different propagation constants. When more than two fibers are employed in a single device, the fibers must be made with propagation constants having the desired relationship to one another. For some designs, the fibers must be made in sets with differences between propagation constants such that the differences are integral multiples of one another. This imposes significant constraints and costs in the fiber drawing process. Moreover, the adjustments to the fibers required to achieve the desired propagation constants can have undesirable side effects. For example, adjustment of the fiber core composition to yield a particular propagation constant can yield a fiber having a particularly soft core which forms to an elliptical cross-section during the stretching process used to form the couplers. This, in turn, can result in optical performance which varies with the polarization of the light transmitted through the device. Accordingly, further improvements in methods of making Mach-Zehnder devices and in the resulting devices would be desirable.

SUMMARY OF THE INVENTION

One aspect of the invention provides methods of making a Mach-Zehnder device. Methods in accordance with this aspect of the invention desirably include the step of providing a plurality of optical fibers including at least one composite fiber. Each such composite fiber includes a pair of coupling regions and a phase shift region. The phase shift region of each composite fiber has a propagation constant different from the propagation constant of the coupling regions in that fiber. Methods in accordance with this aspect of the invention desirably also include the step of forming a pair of optical couplers at spaced apart locations on the fibers so that the phase shift region of each composite fiber is disposed between the couplers. The step of providing each composite fiber may be performed by splicing a piece of a second stock fiber between pieces of a first stock fiber. In addition to the composite fiber or fibers, the plural fibers used to form the Mach-Zehnder device may include a uniform fiber having the same propagation constant throughout its length. Most preferably, the uniform fiber is formed entirely from a piece of the first stock fiber used to make each composite fiber.

Because the second stock fiber is found only in the phase shift regions of the composite fiber or fibers, the second stock fiber is not subjected to the coupler-forming process and it does not form any portion of the couplers. Therefore, the characteristics of the second stock fiber can be selected without regard for its performance in the coupler-forming process. The optical path length of the composite fiber depends upon the length of the piece of second stock fiber incorporated in the composite fiber. Thus, the optical path length of the composite fiber can be controlled by controlling the length of the second stock fiber piece incorporated in the composite fiber, without affecting the overall physical length of the fiber between the couplers. Preferably, all of the fibers have the same overall length between the couplers. The length of the piece of second stock fiber which forms the phase shift region of each composite fiber can be adjusted to compensate for deviations of any fiber propagation constants from nominal values. Where the process is used to form a Mach-Zehnder device with more than two fibers extending between the couplers, the plurality of optical fibers may include a plurality of composite fibers. Here again, all of the fibers may have the same physical length between the couplers. The optical path lengths of the composite fibers are directly related to the lengths of the pieces of second fiber incorporated in each such composite fiber. Therefore, precise relationships between the optical path length differences between the various fibers can be achieved readily without any need to make special fibers with numerous different propagation constants. Most preferably, all of the uniform and composite fibers are formed entirely from the same first and second stock fibers.

In particularly preferred arrangements of the invention, the step of forming the couplers includes the step of encasing the fibers in a matrix glass and elongating the fibers to form narrow sections extending alongside one another within the matrix glass. Preferably, only the coupling regions of the composite fibers and portions of the uniform fiber, where used, are elongated to form the couplers. Most preferably, the step of encasing the fibers in a matrix glass is performed by disposing the fibers in the bore of a tube of the matrix glass and collapsing the tube onto the fibers to form collapsed regions, and the step of elongated the fibers includes the step of elongating a portion of each collapsed region and the fiber portions disposed therein. These steps of the process may be performed in accordance with the aforementioned '205 patent.

A further aspect of the present invention provides a Mach-Zehnder device including plural optical fibers. The plural fibers include at least one composite fiber, each such composite fiber including a pair of coupling regions and a phase shift region. The phase shift region of each composite fiber has a propagation constant different from the propagation constant of the coupling regions of the fiber. The device according to this aspect of the present invention includes a pair of optical couplers at spaced-apart locations on the fibers, the phase shift region of each composite fiber being disposed between the couplers. Most preferably, all of the fibers have substantially equal total length between the couplers. The plural fibers desirably include a base fiber such as a uniform fiber having the same propagation constant throughout its length. The coupling region of each composite fiber may have a propagation constant substantially equal to the propagation constant of the uniform fiber, and the phase shift region of each composite fiber may have a propagation constant different than the propagation constant of the uniform fiber. Thus, the optical path length difference of each composite fiber relative to the base or uniform fiber depends upon the length of the phase shift region in the composite fiber. Preferably, the propagation constants of the phase shift regions of all of the composite fibers are equal to one another and hence the magnitude of the phase shift in each composite fiber relative to the uniform fiber will be directly proportional to the length of the phase shift region of each composite fiber. Where plural composite fibers are employed, the lengths of the phase shift regions of the various composite fibers may be rational multiples of one another and preferably, integral multiples of one another. Desirably, the device is formed as a monolithic Mach-Zehnder device incorporating a tube of matrix glass surrounding the fibers and forming the matrix of the couplers.

These and other objects, features and advantages of the present invention will be more readily apparent from the detailed description of the preferred embodiments set forth below, taken in conjunction with the accompanying drawings.

BRIEF DESCRIPTION OF THE DRAWINGS

FIG. 9 is a view similar to FIG. 6 but depicting a device in accordance with a further embodiment of the invention.

FIG. 10 is a diagrammatic view of an assemblage of fibers utilized in a process according to a further embodiment of the invention.

FIG. 11 is a sectional view depicting the Mach-Zehnder device made from the fibers shown in FIG. 10.

DETAILED DESCRIPTION OF THE PREFERRED EMBODIMENTS

Figure 1:
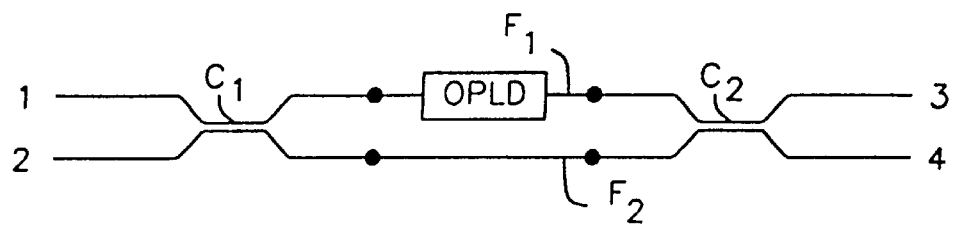
FIG. 1 is schematic diagram of a Mach-Zehnder interferometer.
Figure 2:
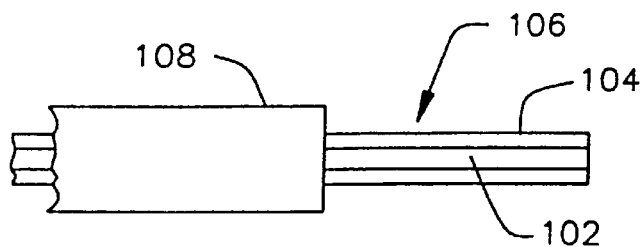
FIG. 2 is a diagrammatic elevational view depicting a fiber during one stage of the manufacturing process in accordance with an embodiment of the invention.
Figure 3:
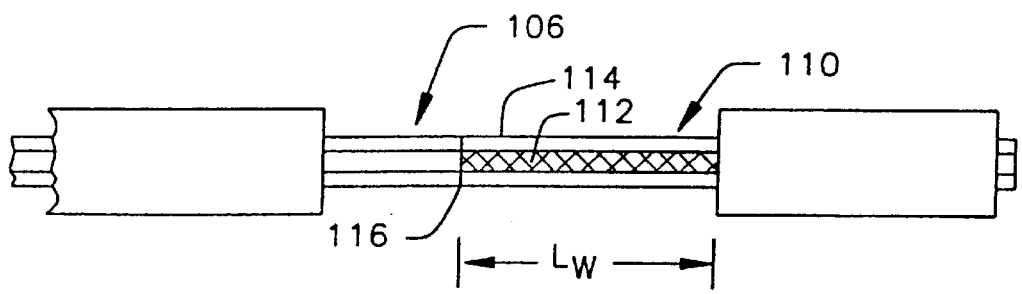
FIGS. 3, 4 and 5 are views similar to FIG. 2 but depicting the fiber at later stages of the process.
Figure 4:
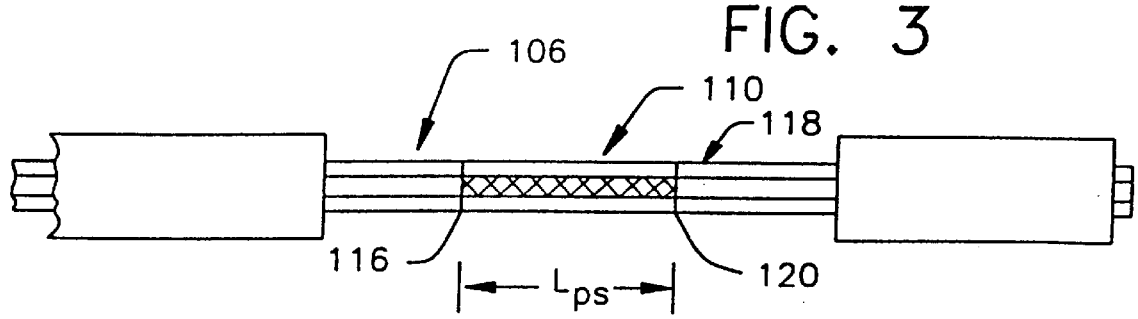
Figure 5:
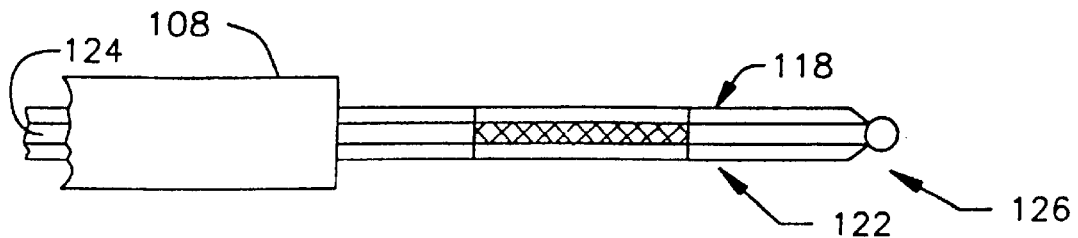

Referring to FIGS. 2–5, a process in accordance with one embodiment of the invention begins with a piece 106 of a first stock optical fiber. In the particular arrangement illustrated, the first stock fiber is a step-index glass optical fiber of the type having a core 102 with relatively high refractive index and a coating 104 with a relatively low refractive index surrounding the core. The fiber also has a conventional polymeric coating 108 surrounding the glass coating. The first stock fiber is severed to form piece 106. Coating 108 is removed in the region adjacent the severed face. The length of piece 106 is not critical to the process; it merely must be long enough to accommodate formation of the couplers as discussed below. In the next stage of the process, a second stock fiber is cut to provide a piece 110 having a working length $L_w$. The second stock fiber is also a step-index fiber having a core 112 and coating 114. Any polymeric overcoating is removed from piece 110. The second stock fiber has a propagation constant β different from the propagation constant of the first stock fiber. Thus, at least one parameter of the second stock fiber which influences the propagation constant of light transmitted therein is different from the corresponding parameter of the first fiber. Most preferably, the diameter of core 112 is the same as the diameter of core 102 in the first stock fiber. However, the refractive index of core 112 may differ from that of core 102. Also, the refractive index of second fiber coating 114 may differ from the refractive index of first fiber coating 104. Piece 110 is spliced to piece 106 at a joint 116. The splicing process used to form joint 116 should provide sufficient time at elevated temperature to allow diffusion between cores 102 and 112, and thereby form a gradual transition between the two cores. This minimizes losses in optical power at the joint. Most preferably, the joint has a loss less than about 0.2 dB. After formation of joint 116, second fiber piece 110 is cleaved to the desired phase shift region length $L_{ps}$. This length is measured from joint 116 and controlled as precisely as possible. The length $L_{ps}$ is selected to provide the desired optical performance in the finished device as discussed further below. A second piece 118 of the first fiber used to form piece 106 is cut and joined with piece 110 at a second joint 120. The length of fiber piece 118 is also not critical. Here again, the joint is formed with a diffused, gradual interface to suppress losses at joint 120. Conventional fusion splicing equipment can be used to make joints 116 and 120. The joining procedures result in a composite fiber 122 with two pieces 106 and 118 of the first fiber and a piece 110 of the second fiber spliced therebetween. The first fiber pieces 106 and 118 form coupling regions of the composite fiber, whereas the second fiber piece 110 forms the phase shift region.

The composite fiber is then terminated to provide the types of end terminations required in the final product. For example, where an end 124 of the composite fiber is to be connected to an input or output of the Mach-Zehnder device, it is severed and prepared for joining in the normal manner. Alternatively, where an end 126 is to remain unconnected, it can be provided with an anti-reflection termination in accordance with the teachings of U.S. Pat. No. 4,979,972. Thus, coupling region 118 is heated and pulled to sever it and then further heated to cause the glass to form a ball-like rounded end face having a diameter equal to or slightly smaller than the original outer diameter of the fiber coating.

Figure 6:
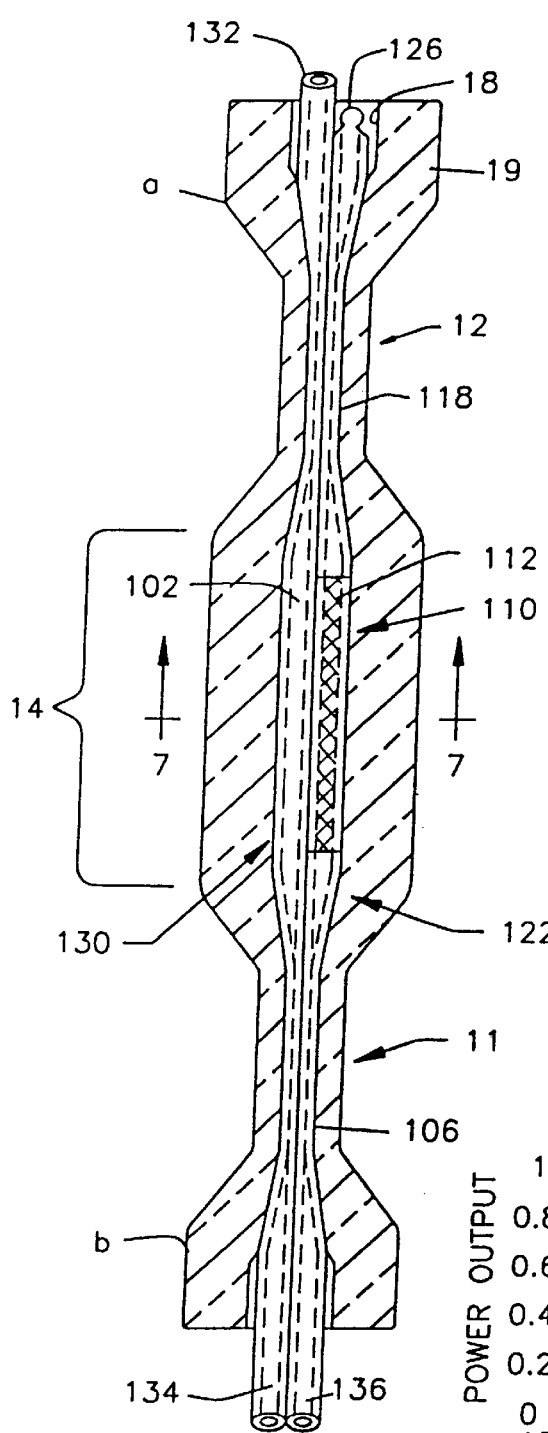
FIG. 6 is a sectional view depicting the Mach-Zehnder device in accordance with one embodiment of the invention.

Composite fiber 122 is then formed into a monolithic device including this composite fiber together with a uniform fiber 130 (FIG. 6). Uniform fiber 130 is another piece of the same first fiber used to form the coupling regions 106 and 118 in the composite fiber. Thus, the uniform fiber has the same propagation constant as the coupling regions of the composite fiber. The steps in the device formation process after formation of the composite fiber may be substantially identical to the steps used in forming a Mach-Zehnder device according to the aforementioned U.S. Pat. No. 5,295, 205. Thus, the Mach-Zehnder device (FIG. 6) is formed as a monolithic structure that contains concatenated overclad couplers 11 and 12 that are joined by a phase shifting region 14. Phase shifting region 14 includes the phase shift region 110 of the second fiber. The device is formed by inserting composite fiber 122 and uniform fiber 130 (with overcoating removed) into the bore 18 of a tube of matrix glass 19. The refractive index of that portion of the matrix glass tube adjacent the fibers is less than the lowest refractive index of the fiber coating 104. The bore can be provided with funnels (not shown) at each end to facilitate insertion of the fibers. The combination of tube and fibers is referred to as a coupler preform.

Figure 8:
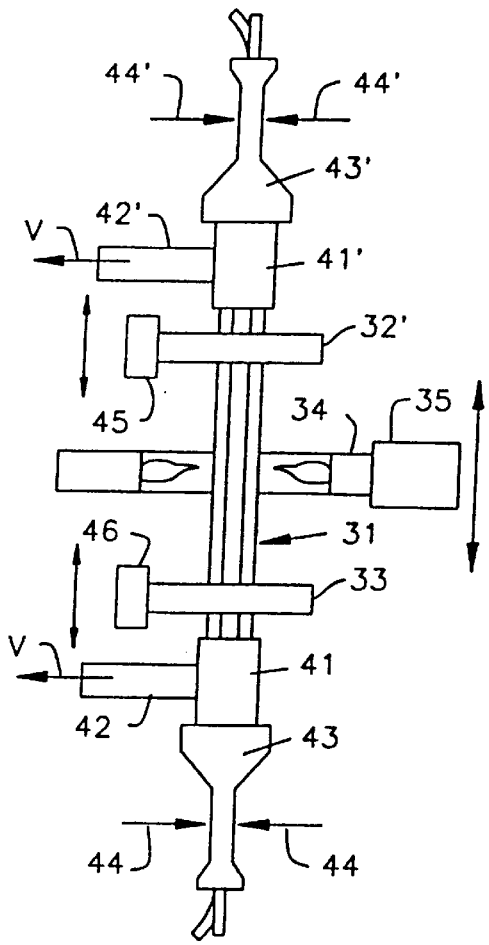
FIG. 8 is a schematic illustration of an apparatus utilized in manufacture of the device of FIG. 6.

The coupler preform can be further processed in the draw apparatus of FIG. 8. Preform 31 is inserted through ring burner 34 and is clamped to draw chucks 32 and 33 which are mounted on motor controlled stages 45 and 46. The fibers are threaded through the vacuum attachments 41 and 41' which are then sealed to the ends of preform 31. Typical vacuum attachments are disclosed in U.S. Pat. No. 5,011,251 which is incorporated herein by reference. Vacuum is supplied to tube 41 through line 42. One end of a length of thin rubber tubing 43 is attached to that end of vacuum attachment 41 opposite preform 31; the remaining end of the tubing extending within tube clamping means (not shown). Upper vacuum attachment 41' is similarly associated with line 42', tubing 43' and tube clamping means. Coated portions of the fibers extend from tubing 43 and 43', the fiber portions within the tube 19 between points a and b (FIG. 6) being uncoated. When air pressure is directed against tubing 43 and 43' as indicated by arrows 44, 44', to clamp the tubing against the fibers extending therethrough, bore 18 is evacuated through lines 42 and 42'.

In one embodiment, that portion of the tube between points a and b is initially collapsed onto the fibers. After the preform is affixed to chucks 32 and 33 and the tube bore is evacuated, the tube is heated near one end to cause it to collapse at the region of applied heat. Chucks 32 and 33 move the preform relative to the burner to gradually extend the collapsed region toward the opposite end of the preform until the desired length of collapsed tube is obtained.

In an alternative process, chucks 32 and 33 can be fixed, and burner 34 can be mounted on a motor controlled stage 35. Burner 34 is initially positioned near one end of the preform to cause it to collapse; stage 35 moves the burner relative to the preform to extend the collapsed region toward the preform's opposite end.

Thereafter, coupler 11 is formed near one end of the preform by heating a region of the tube and moving computer controlled stages 45 and 46 in opposite directions to stretch the heated region. The tube stretching operation can be performed in accordance with U.S. Pat. No. 5,011,251. The rate at which the two tube ends move away from each other constitutes the combined stretch rate. The tube can be stretched at a constant rate, or the stretch rate can vary continuously or in discrete steps. The stretching operation can stop after a predetermined coupling is achieved; thereafter, the tube can be reheated, and stretching can occur at a second stretch rate. Coupler 11 is illustrated as having a constant diameter even though a slight taper exists therein, whereby the longitudinal center of the coupler exhibits the minimum diameter. It is well known that the coupling characteristics of the resultant coupler are determined by such parameters as the optical and mechanical characteristics of matrix glass 19 and fiber 130 and the coupler regions 106 and 118 of composite fiber 122. The coupling characteristics can be influenced by coupler parameters such as the length and shape of the neckdown and tapered regions.

While stretching the tube to form the first coupler, optical power can be coupled to an input optical fiber, and the output signals can be monitored to control process steps in the coupler manufacturing process. Alternatively, trial devices can be fabricated using trial stretching distances within this stage, and the optimum stretching distance can be determined by measuring. In previous experience with overclad fiber optic couplers, the total stretching distance for both stages during the formation of each coupler was usually between 12 and 16 mm.

For best performance as a filter or a WDM coupler, couplers 11 and 12 have substantially identical coupling characteristics. The second coupler 12 is therefore preferably formed by subjecting the appropriate region of the tube to stretching conditions that are identical to those used to form the first coupler. Although couplers 11 and 12 can be achromatic or WDM type, the Mach-Zehnder device will be useful over a wider wavelength range if achromatic couplers are used. Various techniques can be used to obtain achromaticity.

In accordance with U.S. Pat. No. 5,268,979 entitled "Achromatic Overclad Fiber Optic Coupler," a coupler can be made to be achromatic if the refractive index $n_3$ of the matrix glass body surrounding the coatings of the fibers is lower than the refractive index $n_2$ of the coatings by such an amount that the value of $\Delta_{2-3}$ is less than 0.125%, wherein $\Delta_{2-3}$ equals $(n_2^2 - n_3^2)/2n_2^2$.

For some applications, only one of the fibers of a Mach-Zehnder filter needs to extend from the device at each end. After the device is formed, those portions of fiber 17 that extend from the device may be severed. The severed ends of fiber 17 are then preferably provided with antireflection terminations as aforesaid.

As best seen in FIG. 6, coupler 11 includes only the coupling region 106 of composite fiber 122 and an adjacent portion of the uniform fiber 130, whereas coupler 12 includes the second coupler region 118 of the composite fiber and a portion of uniform fiber 130. The phase shift region 110 of the composite fiber is disposed between the couplers, and is not elongated during the coupler formation process. The resulting Mach-Zehnder device can be supplied with light through an input end 132 and can deliver power at a first output end 134 and a second output end 136. The fraction of the input power appearing at the first output end is a function of the wavelength of the applied light as follows:

$$P = \cos^2 \{(\pi) (L_{ps}) (d\beta/\beta) (1/\lambda)\} \quad (1)$$

where:
P equals the fraction of the output power appearing at the first output port 134;

$L_{ps}$ is the length of phase shift region 110 in the composite fiber;

$d\beta$ is the difference in propagation constant between the phase shift region of the composite fiber and the propagation constant of uniform fiber 130;

$\beta$ is the lower of the propagation constant of phase shift region 110 and the propagation constant of the uniform fiber 130; and $\lambda$ is the wavelength of the applied light.

For single-mode transmission where all fibers transmit in the same mode, equation (1) can be restated as:

$$P = \cos^2 \{(\pi) (L_{ps}) (dn/n) (1/\lambda)\} \quad (2)$$

Where:
n is the lower of the effective refractive index of phase shift region 110 and the effective refractive index of the uniform fiber 130; and dn is the difference between the effective refractive indices of the composite fiber and of uniform fiber 130.

The effect that different cores have on the effective refractive index can be estimated by assuming half the power of a single mode guide is in the core and by increasing the delta ($\Delta$) of a fiber. The effective index changes approximately as $$dn/n = (\Delta_{1-2} + \Delta_{1-2}')/2 \quad (3)$$

where $\Delta_{1-2}$ equals $(n_1^2 - n_2^2)/2n_1^2$ and $\Delta_{1-2}'$ equals $(n_1'^2 - n_2'^2)/(2n_1'^2)$, $n_1$ and $n_1'$ being the refractive indices of cores 102 and 112 of the first and second fiber respectively. Also $n_2$ and $n_2'$ are the refractive indices of coatings 104 and 114 in the first and second fibers. The difference in effective refractive index between fiber 130 and the phase shift region 110 of composite fiber 122 would then be $$dn/n = (\Delta_{1-2} + \Delta_{1-2}')/2 - 2 \cdot \Delta_{1-2}/2 \quad (4)$$
$$= (\Delta_{1-2}' - \Delta_{1-2})/2$$

Equation (4) can be inserted into equation (2) to obtain $$P = \cos^2 (\pi) (L_{ps}) (\Delta_{1-2}' - \Delta_{1-2})/\lambda) \quad (5)$$

Figure 7:
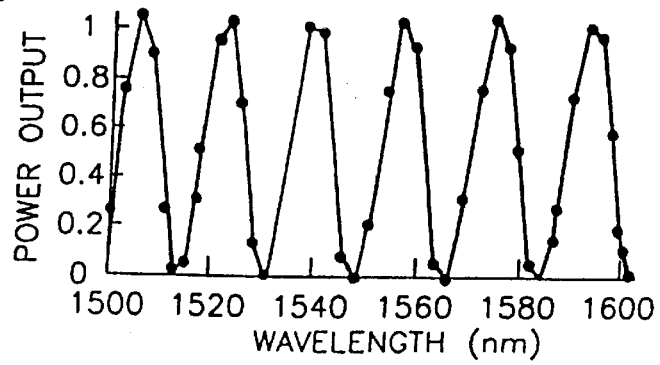
FIG. 7 is a graph depicting the power output characteristics of the device of FIG. 6.

Equation (5) is plotted in FIG. 7 for a single-stage Mach-Zehnder filter in which fiber 130 has a $\Delta_{1-2}$ value of 0.3% and the phase shift region 110 of the composite fiber has a $\Delta_{1-2}$ value of 1.0%, the length $L_{ps}$ of phase shift region 110 being 1 cm. At those wavelengths where P is a maximum, substantially all of the light applied through first input 134 (less any losses in the device) is delivered to the first output end 132. At those wavelengths where p is approximately zero, substantially all of the light supplied through input 134 to the device is delivered to the terminated end 126 and dissipated.

Notably, the relationship between the output power fraction P and wavelength $\lambda$ depends solely on the properties of the fibers and the length $L_{ps}$ of phase shift region 110. Because the optical properties of the coupling regions 106 and 118 of the composite fiber match the optical properties of the uniform fiber 130, the lengths of the coupling regions have no effect on the power function. Thus, the distance between couplers 11 and 12 will have essentially no impact on the performance of the device, so long as the phase shift region 110 of the composite fiber is disposed between the couplers. Accordingly, the coupler formation process can be optimized to provide maximum coupler performance without affecting the power function of the coupler. Moreover, in mass production of couplers, the power function of the devices can be optimized by adjusting the length of phase shift region 110, without affecting any other parameter of the device. For example, if the fibers supplied to the process deviate somewhat from their nominal compositions, the propagation constants of the fibers will also differ from their nominal values. This will affect the power function, causing an increase or decrease in the separation between the peaks of the power function. This can be corrected by increasing or decreasing the length $L_{ps}$ of the phase shift region 110. Such compensation can be achieved without altering the external dimension of the finished product, and without changing the coupler formation processes.

As disclosed, for example, in the aforementioned '205 patent, Mach-Zehnder devices can be concatenated in series, to provide different filtering characteristics. One such arrangement uses two devices, the second having an optical path length difference or delay twice the optical path length difference or delay of the other device. Only one fiber of the first device is carried through into the second; the other fiber is terminated. The resulting device has a power function equal to the product of the power functions of the individual devices, and hence has a power function with widely separated peaks. Such a device may employ a first composite fiber 122' (FIG. 9) having a phase shift region 110' and a second composite fiber 123' having a phase shift region 111' twice the length of the first phase shift region 110'. Each composite fiber may have a ball-terminated light blocking end 125'. The composite fibers may be arranged end-to-end within the bore of a tube 19', with the light-blocking ends 125' of the fibers adjacent one another. A uniform fiber 130' extends entirely through the tube. Couplers 11' may be formed at four locations along the tube, so as to provide a coupler on each side of each phase shift region. Alternatively, the two composite fibers 122' and 123' may be replaced by a single, continuous composite fiber having both phase shift regions 110' and 111', and the single uniform fiber may be replaced by two shorter uniform fibers terminated with light-blocking ends at the mid-point, between the two Mach-Zehnder devices and hence between the second and third couplers.

The use of composite fibers provides significant advantages in fabrication of such a multi-stage device. Here again, the optical path length difference of each Mach-Zehnder device can be selected by selecting the length of the phase shift region of the composite fiber. Therefore, the second Mach-Zehnder device can be fabricated with an optical path length difference precisely twice that of the first, and its precision can be maintained even where the properties of the fibers supplied to the process deviate from nominal values. Similar advantages can be provided when other relationships between the phase shifts provided in the various stages must be maintained.

As disclosed in U.S. Pat. No. 5,011,251, certain methods of achieving achromatic performance in the couplers require that the refractive indices of the fiber coatings in the couplers have slightly different values. Where that approach is to be used, the uniform fiber 130 must have a coating refractive index different from the refractive index of the coating 104 in the coupling regions of the composite fiber. The other parameters of the uniform fiber (such as its core diameter and core refractive index) desirably are selected so that the effective refractive index n of the uniform fiber and hence its propagation constant β are equal to the effective refractive index and propagation constant of the coupling regions 106 and 108 in the composite fiber.

As disclosed in U.S. Pat. No. 5,351,325 ("the '325 patent"), the disclosure of which is hereby incorporated by reference herein, Mach-Zehnder devices may be made with more than two fibers. Such devices split the input signal provided at one input port into several signals at a multi-way input coupler, direct the split signals along several optical paths having different effective optical path lengths and finally recombine the split signals into a single output signal at an output coupler. Such a device can be made from an assemblage of fibers 200 as depicted in FIG. 10, incorporating two uniform fibers 230*a* and 230*b* and two composite fibers 222*a* and 222*b*. The second composite fiber has a phase shift region 210*b* with a length exactly double the length of the phase shift region 210*a* in the first composite fiber. Here again, the coupling regions 206 and 218 of the fibers have propagation constants equal to the propagation constant of the second uniform fiber 230*b*. Preferably, these coupling regions are formed from pieces of the same stock fiber as used to make the uniform fibers. Also, the propagation constants in the phase shift regions of the composite fibers are equal to one another. Preferably, the phase shift regions are formed from pieces of the same second stock fiber.

The uniform fiber 230*b* and the composite fibers 222*a* and 222*b* are provided with light-blocking terminations at one end. The four fibers are fabricated into a multi-path Mach-Zehnder device using the techniques in the '325 patent. As described therein, the fibers are threaded together through a tube of the matrix glass and the resulting coupler preform is heated and stretched so as to form an input coupler 211 (FIG. 11) and output coupler 212. All of the fibers extend through the length of the device, between the input and output couplers. As best seen in FIG. 11, the phase shift regions 210*a* and 210*b* of the composite fibers are disposed between the input coupler 211 and the output coupler 212.

The coupler configurations can be as illustrated in the '325 patent. As explained therein, the coupler configurations are selected so that essentially all of the light supplied through an input port 232 at an input end of a first fiber 230*a* is transferred from this fiber to the other fibers, and so that substantially equal portions of the light are transferred to each of the other fibers. Essentially none of the light entering the input port 232 propagates along the first in the region between the couplers. The light passing along the other fibers is recombined and transferred back to the first fiber 230*a* at the output coupler the assemblage 212, and passes out of an output port 234. Thus, light passes between the couplers only along uniform fiber 230*b* and along the composite fibers 222*a* and 222*b*. Here again, because of the differential delays induced by the differences in effective optical path lengths among the three fibers 230*b*, 222*a* and 222*b* carrying the light between the couplers, the proportion of the input light appearing at output port 234 will depend upon wavelength. As described in greater detail in the '325 patent, the use of multiple paths in parallel provides greater "finesse". The term "finesse" means the ratio of the wavelength separation between adjacent peaks in the power output function to the width of each peak. Although high values of finesse can be achieved using cascaded, sequential Mach-Zehnder devices as illustrated in FIG. 9, the multi-fiber configuration as illustrated in FIG. 11 provides for high finesse in a single stage.

The various fibers extending through the phase shift portion 214 of the device provide optical path length differences which are integral multiples of one another. Thus, light passing through first composite fiber 222*a* is delayed, relative to light passing through uniform fiber 230*b*. The amount of delay is directly proportional to the length of phase shift region 210a. Similarly, light passing through the second composite fiber 222b is delayed and the amount of delay relative to the light in uniform fiber 230b is directly proportional to the length of phase shift region 210b. Because the degree of delay in various composite fibers is linearly related to the length of the phase shift region in each fiber, the fibers can be precisely matched to yield delays which are integral multiples of one another. This is achieved without the need to match multiple fibers in a series of fibers having precisely graded differences in propagation constants. Mach-Zehnder devices can be made with more than three active optical paths between the input and output couplers. Such devices may incorporate additional composite fibers having phase shift regions which have lengths at greater integral multiples of the length of the shortest phase shift region.

In the embodiments discussed above with reference to FIGS. 10 and 11, the composite fibers are all made with the same propagation constants in the phase shift regions and in the coupling regions. This arrangement is preferred for simplicity and for ease of control in production. Most preferably, all of the coupling regions come from a single batch of one fiber and all of the phase shift regions are also formed from a single batch of another fiber. However, according to the broad compass of the invention, other arrangements are possible. For example, the fibers used to form the phase shift regions of the various composite fibers may be different from one another. In this case, the product $$OPLD = (L_{ps})(d\beta/\beta)$$

for each fiber would be selected so that the various products OPLD are integral multiples of one another, or have some other desired relationship to one another, where dn is the difference between the effective refractive index of the fiber constituting the particular phase shift region and the effective refractive index of the uniform fiber.

In the preferred embodiments discussed above, the coupling regions of the composite fiber are identical to one another (where more than one composite fiber is employed) and identical to the uniform fiber, so that the coupling regions do not induce any phase shift. This makes the performance of the device insensitive to variations in the lengths of the coupling regions and insensitive to the distance between couplers. However, it is possible to make devices according to the invention in which the coupling regions in each composite fiber have propagation constants different from the propagation constants of the corresponding regions in the other fibers, so that the coupling regions also contribute some phase shift. In this instance, the length of the phase shift region would be reduced or increased to compensate for the additional phase shift provided by the coupling regions. Further, although the preferred embodiments discussed above employ a uniform fiber with one or more composite fibers, it is possible to make the device with only composite fibers. That is, the base fiber may also be a composite fiber.

Also, although the foregoing embodiments have been described with reference to step-index fibers, the same techniques can be employed using gradient-index fibers.

According to yet another embodiment of the invention, the phase shift regions of the composite fibers may incorporate a material having a resonant non-linearity. The refractive index of such a material changes when substantial optical power is applied to it. This causes the optical path length difference provided by the phase shift region to change when the pumping power is applied. The Mach-Zehnder device can then be used as an optically controllable switch. By applying pumping illumination so that it propagates through the composite fiber, the effective refractive index of the composite fiber is changed, thereby changing the characteristics of the device and routing light from one output port of the device to another. Devices incorporating such non-linear materials in a composite fiber are disclosed in the aforementioned U.S. patent application Ser. No. 08/489,090 filed on Jun. 9, 1995 (now abandoned) and U.S patent application Ser. No. 08/672,188 filed on Jun. 27, 1996 (now U.S. Pat. No. 5,703,975).

As these and other variations and combinations of the features described above can be utilized without departing from the present invention as defined by the claims, the foregoing description of the preferred embodiments should be taken by way of illustration rather than by way of limitation of the invention as defined by the claims.

What is claimed is:

1. A method of making an Mach-Zehnder device comprising the steps of:
   (a) providing a plurality of optical fibers including at least one composite fiber, each said composite fiber including a pair of coupling regions and a phase shift region, said phase shift region of e ach said composite fiber having a propagation constant different from the propagation constant of the coupling regions of such fiber; and
   (b) forming a pair of optical couplers at spaced-apart locations on said fibers so that said phase shift region of each said composite fiber is disposed between said couplers.

2. A method as claimed in claim 1 wherein said step of providing each said composite fiber includes the step of splicing a piece of a second stock fiber between pieces of a first stock fiber.

3. A method as claimed in claim 2 wherein each said splicing step includes the steps of fusing said piece of said second stock fiber to a piece of said first stock fiber, then cutting said piece of said second stock fiber to a length, then fusing another piece of said first stock fiber to the piece of second stock fiber.

4. A method as claimed in claim 2 wherein said plurality of fibers includes a plurality of composite fibers.

5. A method as claimed in claim 4 wherein pieces of the same first and second stock fibers are used to form all of said composite fibers.

6. A method as claimed in claim 2 wherein said plurality of fibers includes a uniform fiber, said uniform fiber being formed entirely from a piece of said first stock fiber.

7. A method as claimed in claim 1 wherein said step of forming said couplers includes the steps of encasing said fibers in a matrix glass and elongating said fibers to form narrow sections extending alongside one another within said matrix glass.

8. A method as claimed in claim 7 wherein said step of encasing said fibers in a matrix glass is performed by disposing said fibers in the bore of a tube of said matrix glass and collapsing said tube onto said fibers to form collapsed regions, and wherein said step of elongating said fibers includes the step of elongating each collapsed region and the fiber portions disposed therein.

9. A Mach-Zehnder device comprising:
   (a) a plurality of optical fibers including at least one composite fiber, each said composite fiber including a pair of coupling regions and a phase shift region, said phase shift region of each said composite fiber having a propagation constant different from the propagation constant of the coupling regions of such fiber; and (b) a pair of optical couplers at spaced-apart locations on said fibers, said phase shift region of each said composite fiber being disposed between said couplers.

10. A device as claimed in claim 9 wherein all of said fibers have substantially equal total length between said couplers.

11. A device as claimed in claim 10 wherein said plurality of fibers includes a uniform fiber having the same propagation constant throughout its length.

12. A device as claimed in claim 11 wherein said coupling regions of each said composite fiber have a propagation constant substantially equal to the propagation constant of the uniform fiber and said phase shift region of each said composite fiber has a propagation constant different than the propagation constant of said uniform fiber.

13. A device as claimed in claim 12 wherein the propagation constants of said phase shift regions of said composite fibers are equal to one another, whereby the magnitude of the phase shift in each composite fiber relative is to the uniform fiber is directly proportional to the length of the phase shift region of each composite fiber.

14. A device as claimed in claim 13 wherein said plurality of optical fibers includes a plurality of composite fibers, a first one of said composite fibers having a first phase shift region length, and the length of the phase shift region in each other one of said plurality of composite fibers being a rational multiple of said first phase shift region length.

15. A device as claimed in claim 13 wherein said plurality of optical fibers includes a plurality of composite fibers, a first one of said composite fibers having a first phase shift region length, and the length of the phase shift region in each other one of said composite fibers being an integral multiple of said first phase shift region length.

16. A device as claimed in claim 9 wherein said fibers include a base fiber having a base optical path length between said couplers and a plurality of said composite fibers, each of said composite fibers having an optical path length different than the optical path length of said base fiber, whereby each said composite fiber has an optical path length difference relative to said base fiber.

17. A device as claimed in claim 16 wherein said optical path length differences are integral multiples of one another.

18. A device as claimed in claim 9 wherein each said coupler includes stretched portions of said coupling regions of said fibers surrounded by a mass of matrix glass.

19. A device as claimed in claim 18 further comprising a tube integral with said masses of matrix glass in said couplers surrounding said fibers between said couplers.

20. A device as claimed in claim 9 wherein the device consists of two optical fibers.

21. A device as claimed in claim 9 wherein the device consists of three optical fibers.

22. A device as claimed in claim 9 wherein the device consists of four optical fibers.

23. A device as claimed in claim 9 wherein said plurality of optical fibers is comprised of:

a first composite fiber having a first spliced in phase shift region fiber length; and a second composite fiber having a second spliced in phase shift region fiber length.

24. A device as claimed in claim 23 wherein said first spliced in phase shift region fiber length is an integral multiple of said second spliced in phase shift region fiber length.

25. A device as claimed in claim 9 wherein at least one of said optical fibers includes an anti-reflection termination.

26. A method as claimed in claim 1 further comprising the step of providing an anti-reflection termination for at least one of said optical fibers.

27. A method of making a Mach-Zehnder device comprising the steps of:

providing a plurality of optical fibers including at least one composite fiber, each said composite fiber including a pair of coupling regions and a phase shift region, said phase shirt region of each said composite fiber having a propagation constant different from the propagation constant of the coupling regions of such fiber, providing each said composite fiber includes the step of splicing a piece of a second stock fiber between pieces of a first stock fiber, said splicing includes the steps of fusing said piece of said second stock fiber to a piece of said first stock fiber, then cutting said piece of said second stock fiber to a length, then fusing another piece of said first stock fiber to the piece of second stock fiber; and forming a pair of optical couplers at spaced-apart locations on said fibers so that said phase shift region of each said composite fiber is disposed between said couplers.

28. A Mach-Zehnder device comprising:

a plurality of optical fibers including at least one composite fiber, each said composite fiber including a pair of coupling regions and a phase shift region, said phase shift region of each said composite fiber having a propagation constant different from the propagation constant of the coupling regions of such fiber;

a pair of optical couplers at spaced-apart locations on said fibers, said phase shift region of each said composite fiber being disposed between said couplers aid all of said fibers have substantially equal total length between said couplers and said plurality of fibers includes a uniform fiber having the same propagation constant throughout its length.

29. A concatenated Mach-Zehnder optical wave guide device comprising:

a plurality of optical fibers including at least one composite fiber, each said composite fiber including at least a pair of coupling regions and a phase shift region, said phase shift region of each said composite fiber having a propagation constant different from the propagation constant of the coupling regions of such fiber; and at least four optical couplers at spaced-apart locations on said fibers, at least one of said composite fiber phase shift regions being disposed between at least two of said couplers.

30. A device as claimed in claim 29 further comprising a first phase shift region and a second phase shift region wherein the length of said second phase shift region is twice the length of said first phase shift region.

31. Device as claimed in claim 29 wherein an integral glass tube contains said optical fibers.

* * * * *